July 4, 1961

C. M. ALLRED ET AL 2,991,430

AUTOMATIC R-F LEVEL CONTROL

Filed June 3, 1959

INVENTORS
Charles M. Allred
Paul A. Hudson

BY Arthur Vinograd

ATTORNEY

INVENTORS
Charles M. Allred
Paul A. Hudson
BY Arthur Vinograd
ATTORNEY

2,991,430
AUTOMATIC R-F LEVEL CONTROL
Charles M. Allred and Paul A. Hudson, Boulder, Colo., assignors to the United States of America as represented by the Secretary of Commerce
Filed June 3, 1959, Ser. No. 817,961
2 Claims. (Cl. 331—183)

This invention relates to a control circuit for automatically regulating the output level of devices such as radio frequency power generators.

Known systems for controlling the output level of R-F generators generally employ circuits which rectify and filter a sample of the generated R-F signal to be controlled, compare such rectified voltage with a D.C. reference voltage, amplify the difference, and feed such difference back to the R-F generator to reduce the deviation. The stability of such types of control circuits is limited by the stability of the rectifying means employed, the reference voltage and the amplifier drift.

In accordance with the present invention, the R-F power generated by an R-F amplifier is employed to directly generate a D.C control signal proportional to the variations in the R-F power and such control signal is applied directly to the R-F generator to vary the output of the generator so that a uniform, stable output is achieved.

It is accordingly one object of the present invention to provide a control circuit particularly for use in connection with an R-F generator which does not require a reference signal.

Another object of the present invention is to provide a control circuit which is operated directly by the power output of a radio frequency generator and which does not require rectification of the output signal which is to be controlled.

Still another object of the present invention is to provide a control circuit for use in connection with R-F generators in which ambient temperature conditions have little effect on the stability of the control circuit.

In accordance with still another object the control circuit is combined with special means in an R-F generator so that control of the output level of the generator can be effected in a novel manner.

Other uses and advantages of the invention will become apparent upon reference to the specification and drawings in which.

In accordance with the principles of the present invention a temperature-limited diode is coupled to receive a portion of the output of an R-F generator, the output signal of which is to be regulated. A portion of the R-F generator output is directly applied to heat the filaments of the diode. Variations in the power signal applied to the diode accordingly produce a D.-C. control voltage in the plate circuit of the temperature-limited diode which is applied to the R-F generator. The resulting control signal is then utilized in the R-F generator to vary its output in a manner that keeps the R-F output constant.

Figure 2:
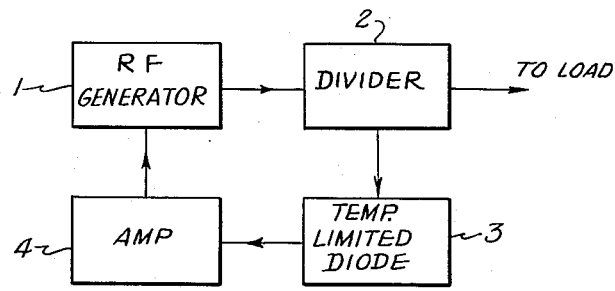
FIG. 2 is a block diagram illustrating the principles of operation of the control circuit of the present invention.

The principle of the invention will become readily apparent from a consideration of the block diagram of FIG. 2. A portion of the output of an R-F generator represented by the R-F source 1 may be applied through an atenuator type divider 2 to a temperature-limited diode circuit 3 to be described in detail in FIG. 3. The temperature-limited diode circuit provides a control signal which is amplified in the amplifier 4 and applied directly to the R-F generator 1. The output of the temperature-limited diode 3 may therefore be directly used to control the output of the R-F generator source 1 in such a way as to keep the power into the temperature-limited diode circuit constant.

Figure 3:
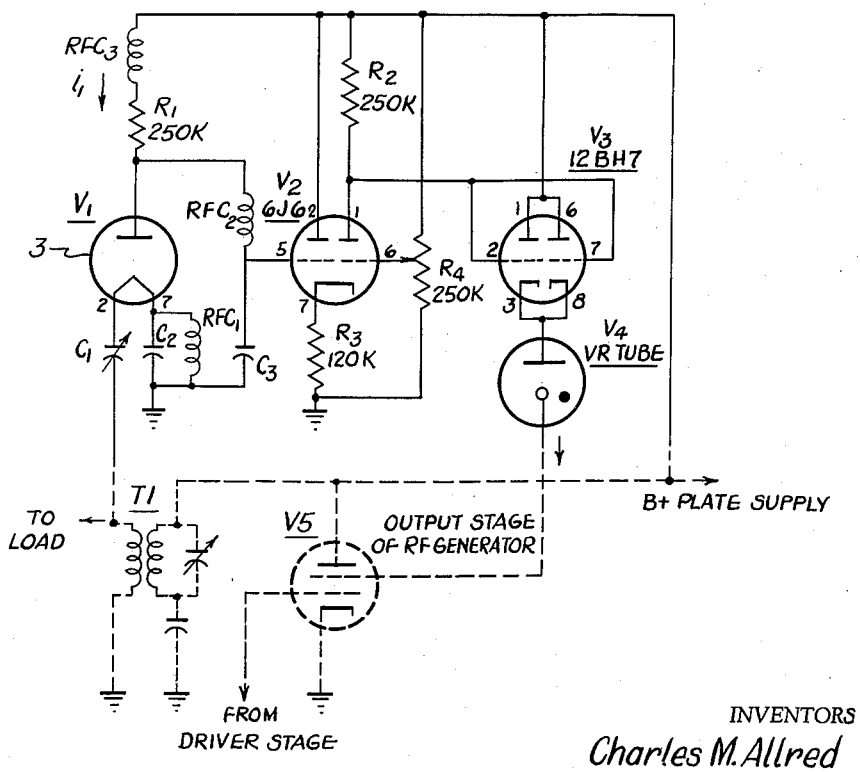
FIG. 3 is a circuit schematic implementing the construction of FIG. 2.

A representative system employing the principles described in connection with FIG. 2 is shown in greater detail in FIG. 3. In FIG. 3 the temperature-limited diode 3 is represented by the tube V1. Tubes of such type are commercially identified as a Kalotron type 2AS15 or 2SM15. Another type of tube having the necessary characteristics is manufactured by the Superior Electric Company and is identified as type 1236C.

In tubes of the temperature limited diode type, the plate current $I_1$ is a function of the cathode temperature. The cathode of the temperature-limited diode V1 shown in FIG. 3 is directly excited by the R-F power obtained from the output stage of an R-F generator the output of which is to be controlled. The power applied to the filament or cathode of the temperature limited diode V1 may be regulated by an adjustable capacitor C1. A second capacitor C2 and a choke RFC1 complete the circuit for energizing the cathode of tube V1. The filament of V1 is accordingly directly heated by a portion of the R-F energy, the level of which is to be controlled.

The output or plate of the temperature-limited diode V1 is connected through a choke RFC2 to the control grid of a cathode-coupled amplifier comprising tube V2. The output of the cathode-coupled amplifier V2 is in turn applied to a cathode-follower circuit comprising the tube V3 which includes a VR tube V4 in its cathode circuit. The cathode follower comprising tubes V3 and V4 provides a low impedance source of current for the screen grid of the R-F generator output stage to be described. The voltage drop across tube V3 is usually about 100–150 volts and the VR tube V4 provides additional drop where needed.

In FIG. 3 a portion of an R-F generator output stage is indicated in broken lines. The output stage may comprise a power tube V5 which is connected to a suitable power supply as indicated. The grid of the output tube V5 is driven from the oscillator portion of the R-F generator (not shown in FIG. 3).

A portion of the output from the R-F output stage V5 is connected to a transformer T1, the output winding of which is coupled through the previously described capacitor C1 to the cathode of the temperature-limited diode V1.

Figure 1:
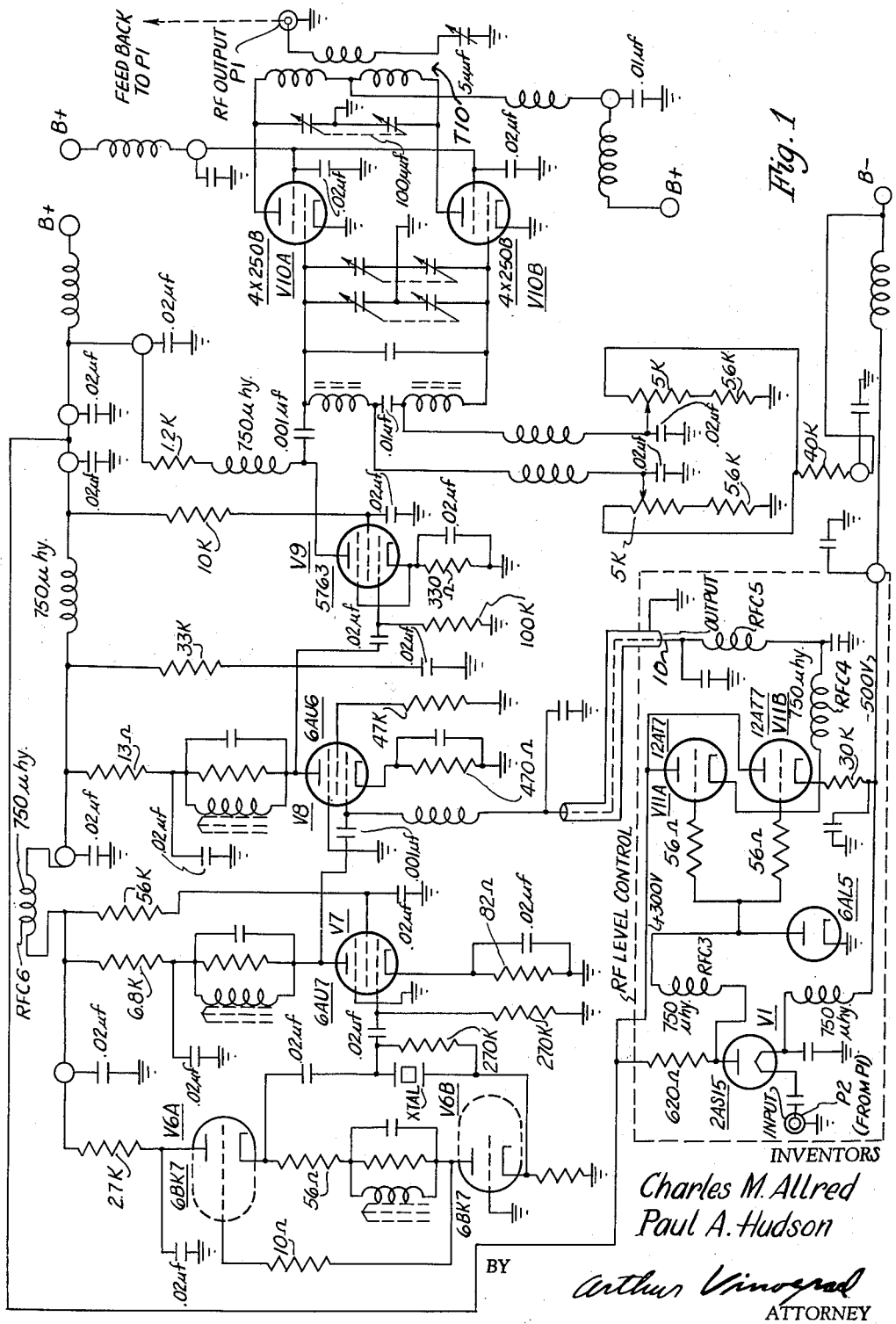
FIG. 1 is a circuit diagram showing the application of the control circuit of the present invention to an R-F generator which is specially modified for the purpose of the present invention.

In the operation of the circuit of FIG. 1 the temperature-limiting characteristics of the tube V1 cause its plate current $I_1$ to vary with the temperature of the cathode V1. The temperature of the cathode V1 is in turn a function of the power input applied to the filament from the R-F generator. Thus, if the ouput of the generator tends to increase, the input to the filament of the diode will also increase and will therefore produce an increase in the plate current $I_1$. The increased plate current produces an increase in the voltage drop across the plate load resistor R1 and the plate voltage of V1 accordingly drops. Hence, the variations of the plate voltage of V1 will be 180 degrees out of phase with variations in the generator output. Such variations in plate voltage are amplified in the stages V2 and V3 and applied through the VR tube V4 with negligible phase shift to the screen grid of the generator output V5.

The open loop gain of the circuit shown in FIG. 3 is about 20,000 and the improvement in output stability of the R-F generator with which the circuit of the present invention has been used is a factor of about 100. For example, output variations of plus and minus 10 percent per hour can be reduced to plus or minus 0.1 percent per hour through the use of the present invention. Actual tests have indicated that variations of the output of the generator shown in FIG. 3 are less than 0.5 percent over a six-hour period.

It will be noted from the circuit diagram of FIG. 3 that the capacitive coupling C1 and C2 between the generator and the cathode of the temperature-limited diode V1 tends to keep the power applied to the filament of V1 at a constant value. Thus, in effect the R-F generator becomes a constant voltage source as far as the input to the tube V1 is concerned. Similarly, if an inductive coupling is employed in place of a capacitive coupling as shown the generator will become a constant current source. Similarly by the use of a directional coupler to the filament of V1, the circuit will cause the incident power through the coupler to remain constant.

FIG. 1 is a complete detailed circuit diagram of the present invention connected to control a typical 30-megacycle, R-F power generator which is specially modified for use in connection with the R-F level control circuit. The portion of the circuit included within broken lines in FIG. 1 represents the R-F level control circuit portion of the present invention. The remainder of the circuit shows the details of construction of the R-F power generator together with the connections between the control mechanism of the present invention and such power source.

In the modification of FIG. 1, the temperature-limited diode V1 is designated by the same reference numeral as employed in FIG. 3.

A dual triode tube V6a, V6b, is employed in a crystal-controlled oscillator, the crystal being connected in the cathode circuit as shown. The output from the crystal oscillator is applied to buffer tube V7 and then through amplifier V8 to a driver tube V9. Driver tube V9 feeds the push-pull output tubes V10a, V10b. The buffer tube V7 prevents feedback from driver tube V9 to the oscillator. The output of the tubes V10a, V10b is obtained from the secondary of a transformer T10.

A portion of the output obtained at output terminal P1 in FIG. 3 is coupled back as a feedback signal to the input terminal P2 in FIG. 3 as shown by the broken-line arrow in FIG. 1.

The control signal from the temperature-limited diode V1 shown within the circuit indicated in broken outline in FIG. 1 to be described is applied through shielded conductor 10 to the tube V8 of the R-F generator. No preliminary amplification of such control signal is required because such signal is fed back to the first amplifier stage in the R-F generator through the plate circuit of V8 and choke AFC6. In other words, the R-F generator provides the necessary signal amplification with the consequent simplification of construction of the control circuit.

In FIG. 1, the portion of the R-F output from output terminal P1 which is fed back to input terminal P2 as above described heats the cathode of the 2AS15 temperature-limited diode V1. As such heating will vary in accordance with variations in the R-F power generated by the R-F generator, the resulting plate voltage change will be 180 degrees out of phase with the input signal as was fully explained in connection with FIGS. 2 and 3. The resulting control signal is applied through choke RFC3 to tubes V11a, V11b, which are connected in parallel. These tubes are employed in a cathode follower circuit in a manner similar to that described in connection with FIG. 3 and the output is taken through chokes RFC4 and RFC5 and applied to the grid of tube V8 through the referred-to conductor 10. The tube V8, which forms part of the R-F power generator, has no grid bias except that generated by the control signal from the control circuit. Accordingly, the transconductance of tube V8 will vary with the control signal and the R-F output obtained from the R-F generator circuit will be regulated accordingly. With the construction of FIG. 1, stabilization in the order of 0.03 percent over a period of 4 hours is readily obtainable.

The circuit construction of FIG. 1 is limited to all but class C type of operation because in class C operation the grids are necessarily driven to saturation and the output of the tube such as V8 will therefore not be a function of the drive applied to its grid. The modification of FIG. 3, however, can be used with an R-F generator employing any type of amplification including class C. Sufficient circuit details and component values are specified in FIG. 1 to enable construction of the invention and accordingly a detailed description of the conventional element of the R-F generator is not considered necessary to an understanding of the invention.

It will be apparent that the embodiments shown are only exemplary and that various modifications can be made in construction and arrangement within the scope of invention as defined in the appended claims.

What is claimed is:

1. An amplitude-controlled signal source comprising a signal generator, signal responsive means controlling the amplitude of the output of said generator, a temperature-limited diode including a plate and a cathode having a first and second terminal, said diode having a voltage-current characteristic in which plate current is a function of cathode temperature, a first impedance element connected between the output of said generator and said first terminal for coupling a portion of the output power of said generator to the cathode of said diode, a second impedance element connected between the second terminal and ground, first means connected to the plate of said diode for providing a control signal having a magnitude inversely proportional to the magnitude of the output power coupled to the cathode of said diode, and means connected between said first means and said signal responsive means for coupling said control signal to said signal responsive means.

2. An amplitude-controlled signal source comprising a signal generator, signal responsive means for controlling the amplitude of the output of said generator, a temperature-limited diode including a plate and a cathode having a first and second terminal, said diode having a voltage-current characteristic in which plate current is a function of cathode temperature, a first impedance element connected between the output of said generator and said first terminal for coupling a portion of the output power of said generator to the cathode of said diode, a second impedance element connected between the second terminal and ground, first means connected to the plate of said diode for providing a control signal having a magnitude inversely proportional to the magnitude of the output power coupled to the cathode of said diode, a cathode follower circuit including an electron tube having at least a plate, control grid and cathode, means connected between said first means and said electron tube for coupling said control signal to said electron tube, and a voltage regulator tube connected between the cathode of said electron tube and said signal responsive means.

References Cited in the file of this patent

UNITED STATES PATENTS 2,570,798   Gullick _____ Oct. 9, 1951